(12) United States Patent
Foti (10) Patent No.: US 8,141,034 B2
(45) Date of Patent: Mar. 20, 2012

(54) SYSTEM FOR AUTOMATING THE DEFINITION OF APPLICATION OBJECTS SUPPORTING COMPRESSING OPERATIONS

(75) Inventor: David A. Foti, Tolland, CT (US)

(73) Assignee: The MathWorks, Inc., Natick, MA (US)

( * ) Notice: Subject to any disclaimer, the term of this patent is extended or adjusted under 35 U.S.C. 154(b) by 1261 days.

(21) Appl. No.: 11/890,689

(22) Filed: Aug. 6, 2007

(65) Prior Publication Data

US 2009/0150430 A1 Jun. 11, 2009

Related U.S. Application Data

(63) Continuation of application No. 11/648,422, filed on Dec. 29, 2006, now Pat. No. 7,958,490.

(51) Int. Cl.
*G06F 9/44* (2006.01)

(52) U.S. Cl. ........ 717/106; 717/108; 717/114; 717/116; 717/120

(58) Field of Classification Search .................. 717/106
See application file for complete search history.

(56) References Cited

U.S. PATENT DOCUMENTS

| | | | |
|---|---|---|---|
| 5,481,710 | A | 1/1996 | Keane et al. |
| 6,108,668 | A | 8/2000 | Bates et al. |
| 6,111,575 | A | 8/2000 | Martinez et al. |
| 6,185,591 | B1 | 2/2001 | Baker et al. |
| 6,192,378 | B1 | 2/2001 | Abrams et al. |
| 6,523,134 | B2 | 2/2003 | Korenshtein |
| 6,618,851 | B1 * | 9/2003 | Zundel et al. ............ 717/103 |
| 7,275,237 | B1 * | 9/2007 | Schneider et al. ........ 717/108 |
| 7,865,872 | B2 * | 1/2011 | Chamieh et al. ......... 717/108 |
| 7,971,194 | B1 * | 6/2011 | Gilboa .................... 717/136 |
| 2004/0006763 | A1 | 1/2004 | Van De Vanter et al. |
| 2004/0006764 | A1 | 1/2004 | Van De Vanter et al. |
| 2004/0225998 | A1 | 11/2004 | Van De Vanter et al. |
| 2004/0268187 | A1 | 12/2004 | Burke et al. |

FOREIGN PATENT DOCUMENTS

EP 1491997 A2 12/2004

OTHER PUBLICATIONS

Gamma, Erich et al., Design Patterns, Elements of Reusable Object-Oriented Software, Addison-Wesley, Boston, (1995).
Loy, Marc et al., "Undo," Java™ Swing, 2nd Edition, O'Reily Media Inc., Chpt. 18 (2002).
International Search Report for Application No. PCT/US2007/026412, dated Aug. 28, 2008.
European Office Action for Application No. 07868089.9, dated Jul. 5, 2010.

\* cited by examiner

*Primary Examiner* — Thomas K Pham
(74) *Attorney, Agent, or Firm* — Nelson Mullins Riley & Scarborough LLP (57) ABSTRACT

A configurable class system for an application author working in an application development environment that automates the handling of undo, redo and logging operations is discussed. The configurable class system removes the burden from the application author of having to custom manage undo, redo and logging information during application writing by providing the necessary mechanisms to every application object created. The configurable class system also allows the application author to handle exceptional state changes in an application by configuring the underlying base classes provided by the configurable class system. Additionally, the embodiments of the present invention enable the application author to customize the compression of a series of identified operations by selecting the type of operations that are to be compressed and the manner in which the compression is to occur.

20 Claims, 5 Drawing Sheets

SYSTEM FOR AUTOMATING THE DEFINITION OF APPLICATION OBJECTS SUPPORTING COMPRESSING OPERATIONS

RELATED APPLICATION

This application is a continuation of, and claims priority to, pending U.S. application Ser. No. 11/648,422, filed Dec. 29, 2006 and entitled "System for Automating the Definition of Application Objects Supporting Undoing, Redoing, Compressing and Logging Operations."

BACKGROUND

Many applications support the ability to undo single or multiple operations that are performed while the application is being executed. For example, word processors typically provide the ability to undo and redo one or many recent text entries. Similarly, in a modeling environment, the execution of a model component with a user supplied parameter may result in a less than desirable result. Frequently the modeling application will allow the user to undo the results of a last operation, such as the execution of a particular component, thereby allowing a user to substitute a different parameter value. Following the substitution of a parameter the model may be re-executed. Similarly, the user may decide that a previous iteration produced a more desirable result and may choose to redo a previously undone operation.

The undo and redo functionality is designed by authors of software applications. Unfortunately, conventional techniques may place a large burden on application authors to create and manage undo and redo information. Application authors are frequently required to define the handling of undo and redo operations for each state change caused by operations in an application. Exemplary state changes in an application include the creation of objects, the deletion of objects and a change in a property value associated with an object. This customization of the handling of undo and redo information is a time-intensive and error-prone procedure.

SUMMARY

The embodiments of the present invention provide a configurable class system for an application author working in an application development environment that automates the handling of undo, redo and logging operations. The configurable class system may remove or alleviate the burden on the application author of having to custom manage undo, redo and logging information during application writing by providing the necessary mechanisms to every application object created. The configurable class system also allows the application author to handle exceptional state changes in an application by configuring the underlying base classes provided by the configurable class system. Additionally, the embodiments of the present invention enable the application author to customize the compression of a series of identified operations by selecting the type of operations that are to be compressed and the manner in which the compression is to occur.

In one embodiment a method for automating the creation of objects encapsulating an undoing of operations performed by an object oriented program includes representing a class instance as including indirect access to a definition of the class of the instance. The class instance is also represented as including indirect access to instance data. The method additionally provides an operation class encapsulating a function to undo an operation performed on the class instance.

In another embodiment a method for automating the creation of objects encapsulating an undoing of operations performed by an object oriented program downloads software to a computing device. The execution of the downloaded software causes the computing device to perform operations which include representing a class instance as including indirect access to a definition of the class of the instance. The operations also include representing the class instance as including indirect access to instance data. The operations also provide an operation class encapsulating a function to undo an operation performed on the class instance.

In an embodiment, a system for automating the creation of objects encapsulating an undoing of operations performed by an object oriented program includes a first class instance represented as including indirect access to a definition of the class of the instance. The first class instance is also represented as including indirect access to instance data. The system also includes an operation object instantiated from an operation class encapsulating a function to undo an operation performed on the first class instance. A second class instance is subclassed from the operation class and performs a selected operation on the first class instance.

In another embodiment, a method obtains a configurable class definition for a logging object. The logging object programmatically logs a specified type of operation performed on an associated application object. A class of the application object is derived from the class of the logging object. The method performs a selected operation on the application object and programmatically identifies the selected operation as a type of operation to be logged before logging the selected operation.

In one embodiment, a method provides a class definition defining a header object that includes a reference to a class for an application object and a reference to data associated with the application object. The method also provides a class definition defining an operation object that encapsulates operations for undoing and redoing operations performed on the application object. The operation object class definition is also exposed to an application author in an application development environment. The method creates an application object class definition using the operation object class as a base class. The class definition of the application object enables the performing of an undoing or redoing of a selected operation performed on the application object.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The embodiments of the present invention address the handling of undo and redo operations through the use of a programming language having an object system that explicitly supports automating the process of defining inverse operations. The system defines default inverse operations for the primitive operations of changing an object's state, creating an object, and deleting an object. The default inverse of complex operations are defined as the application of the inverse of the many primitive operations that make up the complex operation. The system allows an application author to selectively customize or replace the default definitions for inverse operations.

Exemplary embodiments of the present invention provide automated handling of undo, redo, logging and compressing operations performed in an application development environment. The term "method" is sometimes used in the industry synonymous with the term "operation." The provision of configurable base classes from which application objects inherit functionality allows application authors to efficiently assemble applications. Application authors may be able to define classes to represent data, models and user interfaces in their applications, leveraging the operations contained in the base classes. The configurable nature of the provided classes may also give the application authors the opportunity to customize or subclass the base classes to handle exceptional cases that may occur during the execution of an application.

In one exemplary embodiment, a class definition is used to define a header object. The header object includes a reference to a representation of the class definition for an application object and a reference to data associated with the application object. The class definition may define one or more states or properties of the class. The application data may be changed by setting the value of a property. The exemplary embodiment operates on the principle that complex operations on systems of objects can be composed from three kinds of primitive operations: a change to the value of an object property, a creation of a new object, and a deletion of an object. An operation class is provided that defines functions to do and undo an operation. One embodiment further defines a subclass of an operation that is used to generate operation objects when a property is changed. In an alternative embodiment of the invention, additional rules may be defined for complex operations. In yet another embodiment of the invention, a program author may need to specify additional information necessary to do or undo a complex operation.

An operation object encapsulates all data necessary to do and undo a property change, which typically includes a reference to the header object, a means of identifying the property that changed, the previous value of the property and the new value of the property. Operation subclasses are provided that encapsulate the creation and destruction of an object. In the case of object creation, the "do" function creates the object and the "undo" function deletes the object. In the case of deletion, the "do" function deletes the object and undo function creates the object. In either case, the operation object stores sufficient information that the object can be reconstituted in its exact state if the object is deleted and then recreated. In the exemplary embodiment, this sufficient information includes the header object and the object's data serialized as pairs of property names and values. The exemplary embodiment also performs a selected operation on the application object. Additionally the exemplary embodiment supports the performing of either an undoing or redoing of the selected operation performed on the application object. The undoing or redoing of the selected operation uses the information encapsulated in the particular subclass of operation. The exemplary embodiment allows an application to undo or redo individual or sequences of operations while also allowing an application to select what operations will cause the generation of operation objects and thus be able to be undone or redone.

The embodiments of the present invention may include a class definition language, a runtime system that constructs instances of defined classes, and a mechanism for storing and using operation objects that encapsulate state changes within one or more application objects running within the system. Header objects may be instantiated for each application object, whereby the header object is used to interact with an application object data via a compiled representation of the application-defined class. If one object has a property whose value references another object, the first object's data stores a reference to the second object's header. If such a property value changes state such that it refers to a different object, the embodiments of the present invention generate an operation object to encapsulate the property change and store references to both old and new header objects. If the object referenced by the old property value is deleted, an operation object may be constructed to encapsulate the deletion whereby the header object is marked as deleted and then preserved by the operation object. The application class is used to serialize the object, after which the normal act of deletion is performed. If the application causes a sequence of operations to be undone, the deletion operation's undo function may be executed to reconstitute the application data for the deleted object from its serialized representation. The reconstituted application data may then be re-attached to the deleted header object. Because the deleted header object is preserved, the reference to the deleted header object from the first property change operation remains valid and the property change may be undone by setting the property to the old object's header reference. Alternative deletion and/or garbage collecting methodologies may be used in alternative embodiments of the invention.

Figure 1A:
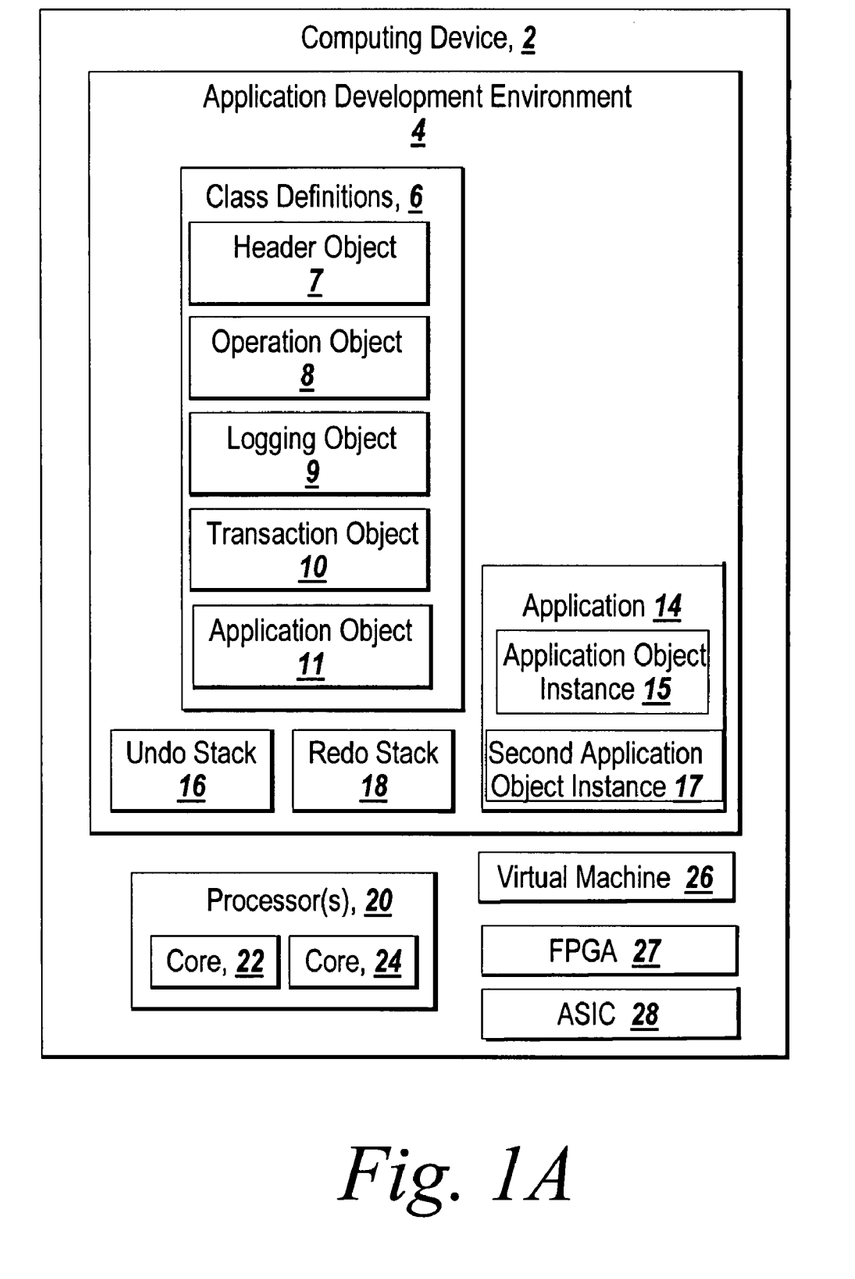
FIG. 1A depicts an environment suitable for practicing an embodiment of the present invention.

FIG. 1A depicts an environment suitable for practicing an embodiment of the present invention. A computing device 2 hosts an application development environment 4. The computing device 2 may be a workstation, server, laptop, mainframe, personal digital assistant (PDA), mobile telephone, a network of computing devices, or any other computing device equipped with a processor and able to support an application development environment 4. The computing device 2 may have a single processor 20 or multiple processors and each of the processors may have one core or multiple cores 22 and 24. The computing device 2 may also host one or more virtual machines 26 in which the application development environment 4 may be executed. The computing device 2 may use hardware acceleration to execute the application development environment and may run code on a Field Programmable Gate Array (FPGA) 27, or an Application Specific Integrated Circuit (ASIC) 28.

Exemplary application development environments in which applications may be developed include MATLAB® and SIMULINK® based environments, both from the The MathWorks, Inc. of Natick, Mass., VISUAL STUDIO® from Microsoft Corporation of Redmond, Wash., and LABVIEW® from National Instruments, Inc. of Austin, Tex. The application development environment is not limited to a full-blown application development environment, and may be any environment or application, which provides ability to users to develop other software applications or to write software code. The application development environment 4 may include a number of class definitions 6. The class definitions 6 may include class definitions for a header object 7, operation object 8, logging object 9, transaction object 10 and application object 11. The class definitions for the header object 7, operation object 8, logging object 9 and transaction object 10 may be base classes from which the application object class 11 is derived so that objects subsequently instantiated from the application object class 11 inherit the functionality of the header object 7, operation object 8, logging object 9, and transaction object 10. The class definitions for the header object 7, operation object 8, logging object 9, and transaction object 10 are discussed in greater detail below.

The application development environment 4 may also include at least one application 14 being developed or otherwise viewed or edited by an application author. The application 14 may be a textual application and/or graphical application, model, script or some other type of executable process. The application 14 includes one or more instances of an application object 15 defined by the application object class definition 11. The application 14 may also include a second application object instance 17 subclassed from the operation object and performing a selected operation on the first application object instance 15. The application development environment 4 may also include memory locations set aside for an undo stack 16 and redo stack 18. The undo stack 16 and redo stack 18 are discussed further below.

The class definition for the header object 7 defines an object that includes a reference to a class for an associated application object and a reference to data associated with the application object. The header object is reusable and is used in conjunction with the operation object to perform undo and redo operations involving the creation and destruction of objects. The class definition for the operation object 9 defines an operation object that encapsulates operations for undoing and redoing operations performed on the application object. Many operations in an object oriented environment are compositions of object creation, object deletion and property changes. The class definition for the operation object 9 makes use of this fact by encapsulating default operations in the operation object for inverting object creation, object deletion and object property changes. For example, the inversion operation of object creation is object destruction. Conversely, the inversion operation of object destruction is object creation (with restoration of data). The inverting of an object property change is the restoration of the previous property value. By providing both the header object class and operation object classes, the application objects have built in mechanisms to programmatically handle these operations without the application author having to perform additional programming.

Conventional uses of inverted composite operations to perform undo and redo operations differ from the embodiments of the present invention in a number of significant ways. In particular, in contrast to previous mechanisms for inverting composite operations, the embodiments of the present invention provide an object oriented programming language with universal support for the creation of operation objects to encapsulate property changes, object creation, and object destruction. Alternative embodiments of the invention may additionally, the present invention reuse automated support for object serialization and de-serialization in the process of inverting object destruction and redoing object creation. A call to the destructor of an application object triggers a call to the encapsulated operation included in the operation object. As will be discussed in more detail in FIG. 3 below, the encapsulated destruction operation in the operation object uses the header object to find data associated with the object being destroyed, serializes the data to another location (such as an undo stack or memory-mapped file), alters the reference in the header object to point to the new serialized data and saves the header object before destroying the original object. Upon a user selection to undo the destruction of the object, the header object is checked for the class of the original object, a new application data object is created, the data is de-serialized to the new object and the reference in the header object to the serialized data is updated to point to the de-serialized data in the new object.

In addition to providing default inverted composite operations used to perform undo and redo operations by the operation object, the exemplary embodiments may also allow an application author to override a default behavior in the encapsulated operations so as to account for exceptional cases. For example, in a SIMULINK® environment, whether or not an object can be created may depend upon whether or not a simulation is running. Certain objects can only be created when the simulation is stopped. Similarly, the inverted operation used to undo the creation of the object can also only take place when the simulation is stopped. A default undo operation may not recognize this requirement. Some embodiments allow the application author to configure the base class so as to handle this exceptional case (such as by placing the undo operation in a queue until the simulation is stopped). Such extension of the base class operations can be accomplished by extending the base class implementation without completely rewriting the base class functionality. For example, a subclass override for the undo method may call the base class undo method before or after doing some additional work.

The class definition of the logging object 9 provides an opportunity for an application author to exercise fine-grained control over logging operations performed during the execution of an application. The configurable class definition allows an application author to indicate that all, none or a specified operation or operations should be logged. The system supplies a base class to provide a logging feature. The application may override methods of the base class to control how information is logged. The application may turn the logging feature on or off using a method of the base class. When the logging feature is turned on for a one or more objects, all operations on those objects will be logged.

The class definition of the transaction object 10 allows an application author to control the visibility, degree and occurrence of compressing operations performed as part of an undo or redo operation. The transaction object includes methods that compress an identified series of operations performed on an application object. For example, in a graphical modeling development environment, a user may wish to drag a block from one location to another. In the context of an undo action, this series of operations, the updating of a location property for the block, could result in a lengthy series of property changes being added to an undo stack with each change in coordinates being recorded. A subsequent undo operation would then need to step through all of the coordinate changes. To avoid this inefficiency, the transaction object provides a method that recognizes when a new operation changes the same property as an existing operation. In one embodiment of the method, each existing operation is queried to see if it can be combined with the incoming operation. The query is made by calling a method on the operation object that takes the newly added operation and returns a combined operation if the combination is possible or else a null object if the combination is not possible. The default property operation implements this query by checking if the incoming operation belongs to the same class (i.e. is a property-change operation), and then checking if the property and header object is the same in both operations. If the answer to both questions is true, then a new operation is created referring to the same header object and property, but having the first operation's old value and the second operation's new value. When an operation returns a new combined operation, the transaction object replaces the old operation with the new combined operation and throws away the incoming operation. This process may be repeated for a series of operations. A subsequent undo operation then allows the user to undo directly to the beginning of the series of operations, i.e.: the beginning position of the block in the example above.

In one embodiment, the application author may configure operation compression by overriding the default method used to perform the compression. The application author is allowed to select the granularity of the compressing operations so that in an addition to the start and end of the transaction additional intermediate data may also be saved for undo and redo operations. Additionally, the application author may select the type of operations which are to be compressed. Also, the application author may designate whether an end user of the application may see the recorded information on a transaction basis or whether the operation data for individual operations occurring within the transaction (the transaction encompassing those operations occurring from the first to the last operation in the series) is exposed to the user.

Continuing with the discussion of FIG. 1A, the undo stack 16 and redo stack 18 are storage locations in the application development environment 4 in which data and objects relating to performed operations may be stored. In one embodiment, the undo stack 16 and/or redo stack 18 may be implemented as a matrix. In one embodiment, the application environment may execute multiple applications or application components and each application or component may have its own undo stack and redo stack.

It should be recognized that although the exemplary embodiments discussed above have been discussed with reference to separate header, operation, logging and transaction objects provided as base classes for an application object class, other embodiments are also within the scope of the present invention. For example, the class for the header, operation, logging and transaction objects may be defined in the application development environment 4 but instead of being provided as base classes, separate instances of the classes may be instantiated and then called by the application object. Similarly, rather than separate objects that each have some of the functionality discussed above, one class may be defined which includes all of the operations discussed in reference to the header, operation, logging and transaction objects. The one class may then be provided as a base class to the application object.

Figure 1B:
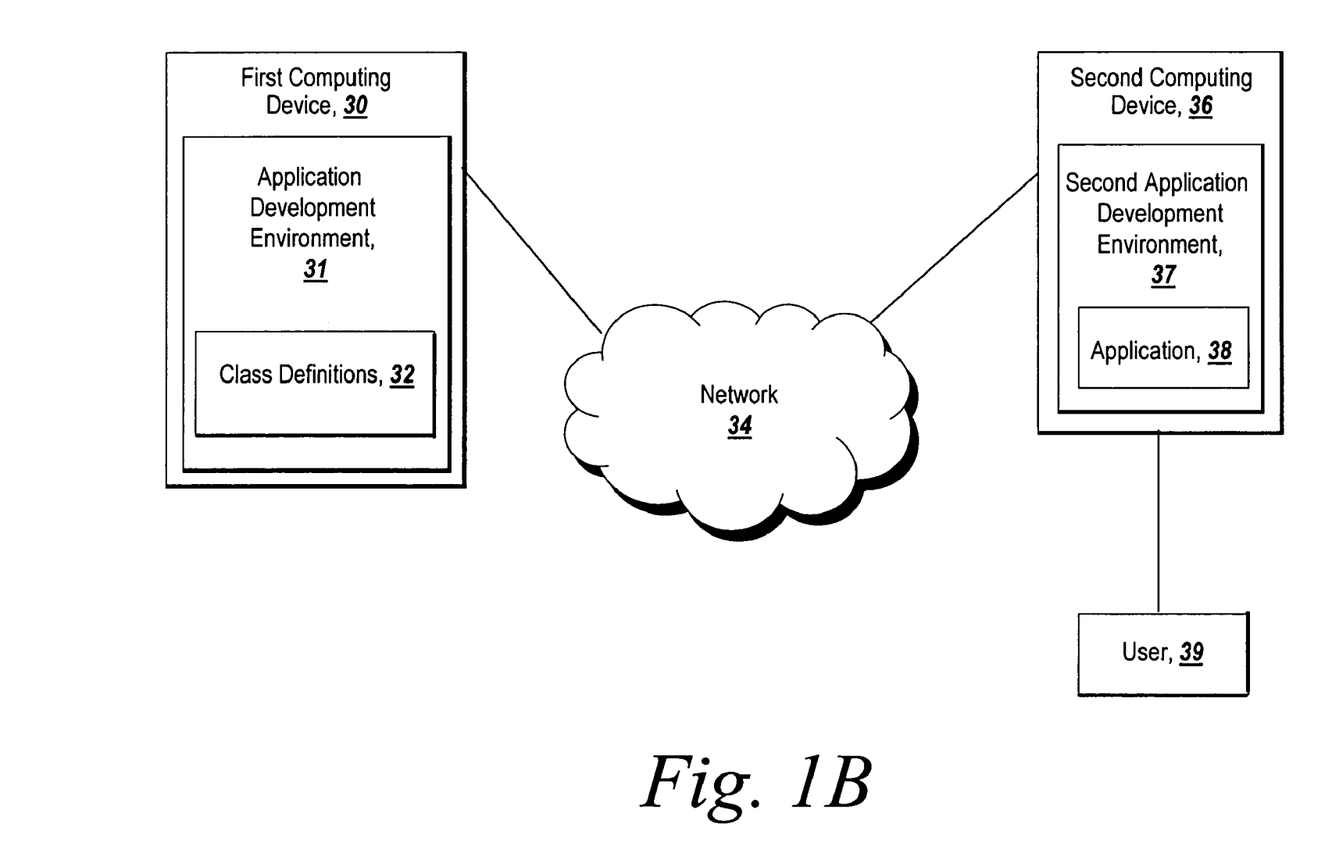
FIG. 1B depicts a distributed environment suitable for practicing an embodiment of the present invention.

It will be appreciated that exemplary embodiments may also be practiced in a distributed environment. FIG. 1B depicts an alternate distributed environment in which a first computing device 30 communicates over a network 34 with a second computing device 36 accessed by a user 39. The first computing device 30 supports an application development environment 31 that includes class definitions 32. The network 34 may be the Internet, a local area network (LAN), a wide area network (WAN), a wireless network, an intranet, an extranet or some other type of network. The second computing device 36 hosts a second application development environment 37 in which an application 38 relying on the class definitions 32 contained in the first computing device 30 is executed.

Figure 2:
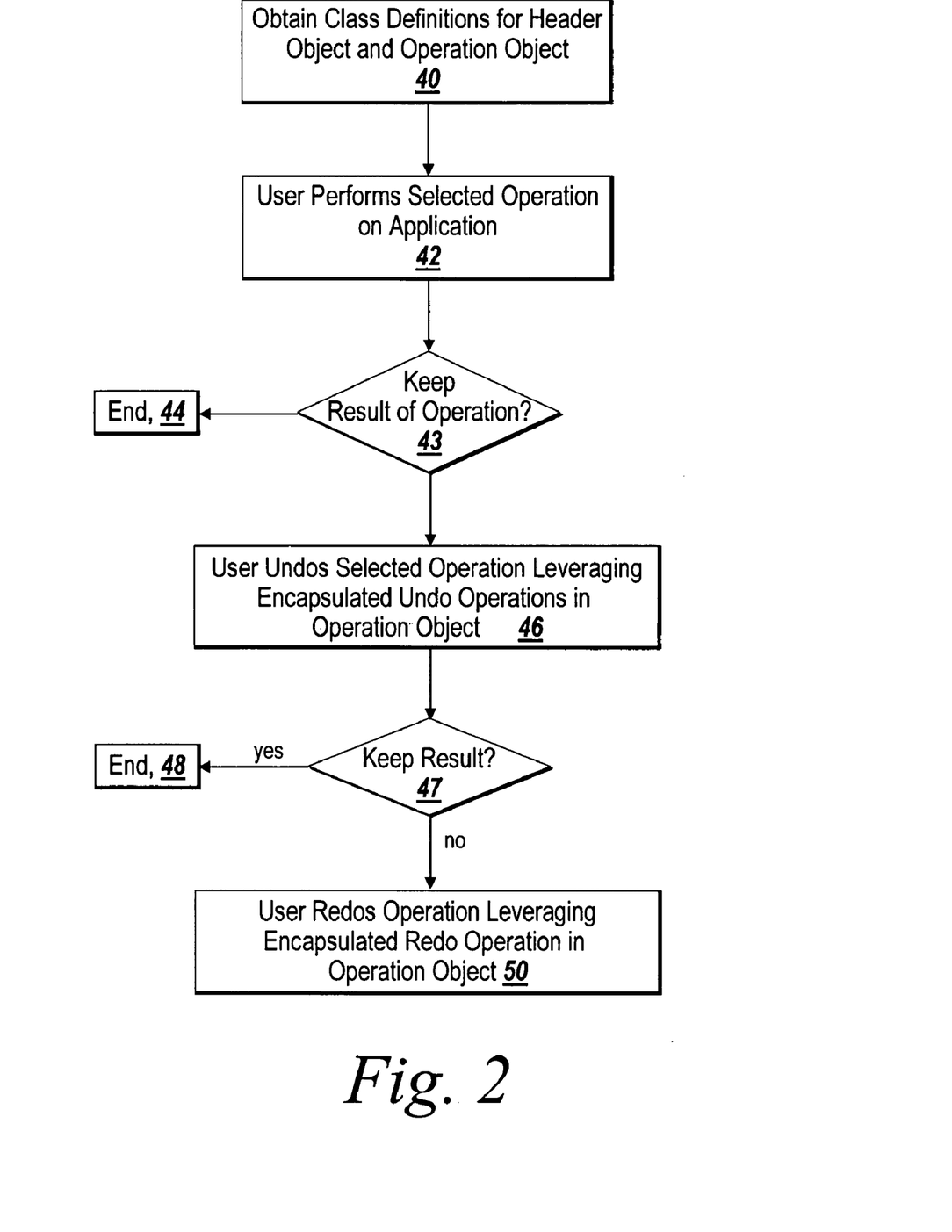
FIG. 2 is a flowchart of a sequence of steps that may be followed by an embodiment of the present invention to undo and redo operations performed in an application developed in the application development environment.

FIG. 2 is a flowchart of a sequence of steps that may be followed by an exemplary embodiment to undo and redo operations performed in an application developed in the application development environment. The sequence begins with the obtaining of class definitions for the header and operation objects (step 40). The header object includes a reference or other indirect access to a class for an associated application object and a reference or other indirect access to data associated with the application object while the operation object encapsulates operations for undoing and redoing operations previously performed on the application object. A user executing the application then performs a selected operation on the application object such as the creation of an application object, the destruction of the application object or a change in a property value for an application object (step 42). If the user decides to keep the result of the operation (step 43) the sequence ends (step 44). Alternatively, if the user decides not to keep the result of the operation (step 43) an undo operation may be performed leveraging the encapsulated undo operation in the operation object (step 46). If the user decides to keep the results (step 47), the sequence ends (step 48). However, if the user decides not to keep the results (step 47), the user may choose to redo the operation leveraging the encapsulated redo operation in the operation object (step 50).

Figure 3:
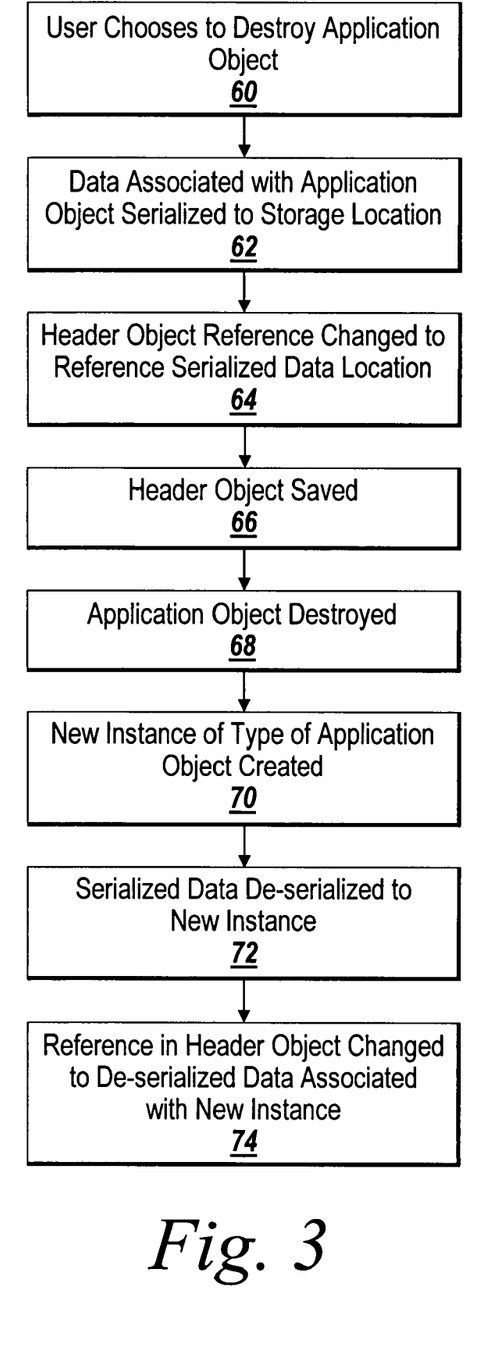
FIG. 3 is a flowchart of a sequence of steps that may be followed by an embodiment of the present invention to serialize and de-serialize data in response to a command to destroy and then undo the destruction of an application object.

Some embodiments described herein provide an efficient mechanism for creating applications that allow the undoing and redoing of operations via a reusable header object. The use of the header object during the undoing of an operation that destroys an object is discussed in reference to FIG. 3. More specifically, FIG. 3 is a flowchart of a sequence of steps that may be followed by an exemplary embodiment to serialize and de-serialize data in response to a command to destroy and then undo the destruction of an application object. The sequence begins with a user choosing to destroy an application object that supports the header and operation object classes discussed above (step 60). A call to a destructor for the object causes the data associated with the application object to be serialized to a storage location (step 62). The header object associated with the application object selected for destruction is then altered so that the reference contained in the header object is redirected from the data associated with the application object to the serialized data storage location (step 64). The header object is saved (step 66) and the application object is then destroyed (step 68). Following the selection/entry of an undo command by the user, the saved header object is consulted to identify the reference to the class of the now destroyed application object and a new instance of the type of application object is created (step 70). The serialized data is deserialized to the newly created object (step 72) and the reference in the header object to the deserialized data is changed so that it references the data associated with the new instance (step 74).

Figure 4:
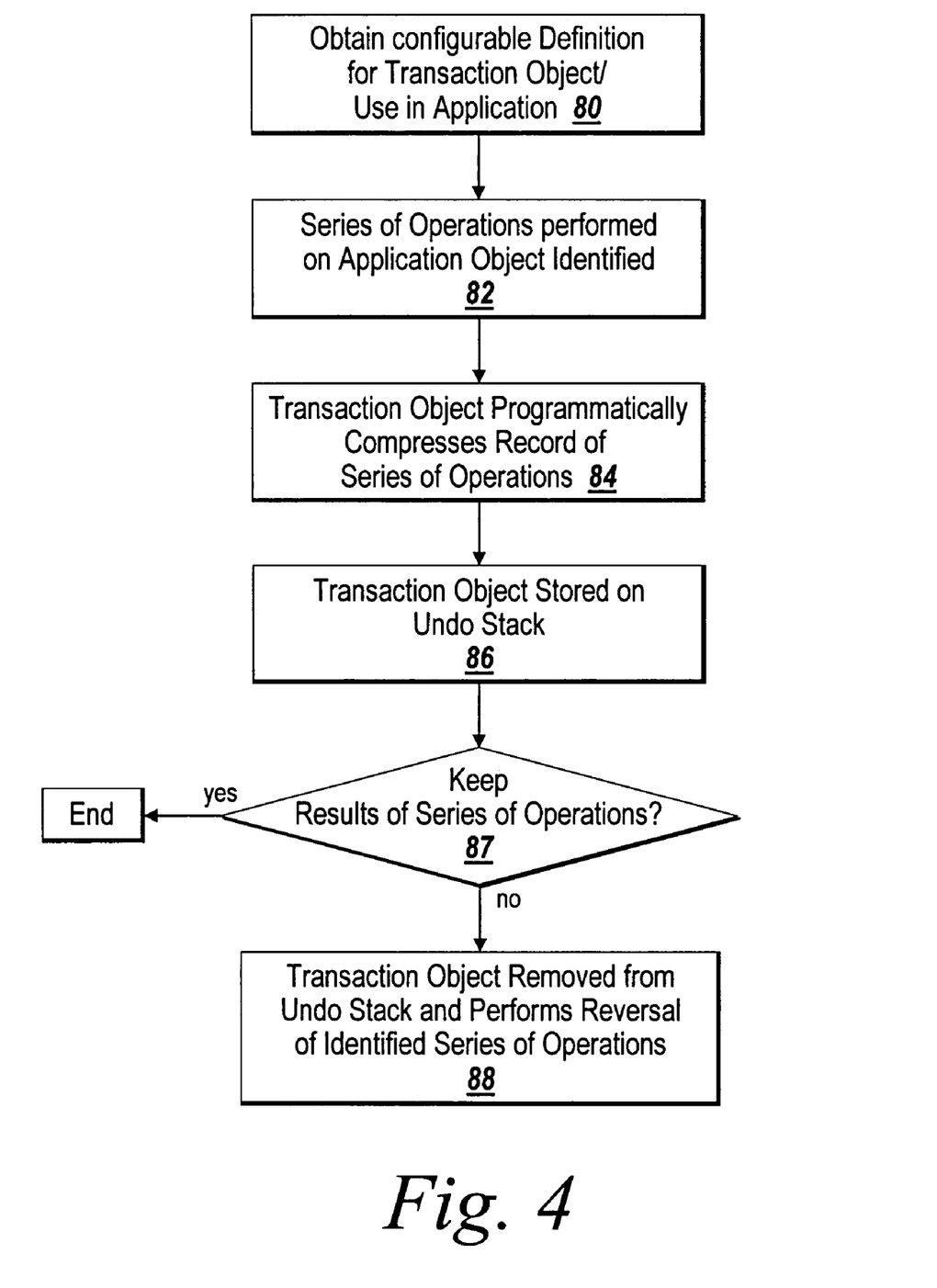
FIG. 4 is a flowchart of a sequence of steps that may be followed by an embodiment of the present invention to compress an identified series of operations and then subsequently undo the compressed operations.

The exemplary embodiments may also provide to an application author a fine grained control over the performance of compressing operations through the use of a configurable class definition. FIG. 4 is a flowchart of a sequence of steps that may be followed by an embodiment of the present invention to compress an identified series of operations and then subsequently undo the compressed operations. The sequence begins with the obtaining of a configurable definition for a transaction object (step 80). The transaction object includes operations to compress the recording of an identified series of operations performed on the application object. During the subsequent execution of an application created in the application development environment that includes an application object derived from the transaction object class, a series of operations performed on the application object is identified (step 82). The transaction object programmatically compresses the record of the series of operations (step 84) and is saved on an undo stack (step 86). The transaction object may record the first and last operation in the identified series of operations or may also record additional operations up to and including all of the operations in the series. If the user decides to keep the results of the series of operations (step 87), the sequence ends (step 88). Alternatively, if the user does not decide to keep the results of the operations (step 87) the transaction object is removed from the undo stack and performs the reversal of the series of recorded operations (step 88).

A transaction object may also be used to group simple operations. For example, if a user selects a series of blocks and then changes the color of the selected blocks, the application may wish to encapsulate this change as a transaction that "changes the color of the selection to red" rather than showing separately the color change on each selected object. An additional function of a transaction object is to create an atomic operation where each constituent transition must succeed or none of the constituent transitions will take place. As the individual operations in a transaction are executed, if any one fails, the transaction stops executing, previously executed operations are undone, and the error is reported.

The present invention may be provided as one or more computer-readable programs embodied on or in one or more mediums. The mediums may be a floppy disk, a hard disk, a compact disc, a digital versatile disc, a flash memory card, a PROM, an MRAM, a RAM, a ROM, or a magnetic tape. In general, the computer-readable programs may be implemented in any programming language. Some examples of languages that can be used include MATLAB, FORTRAN, C, C++, C#, Python or Java. In particular, some embodiments of the invention may be implemented in dynamically typed and/or array-based languages, such as, for example, in a language, a subset of commands of which is executable in the MATLAB® programming environment. The software programs may be stored on or in one or more mediums as object code. Hardware acceleration may be used and all or a portion of the code may run on a FPGA, an ASIP, or an ASIC. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. A physical medium holding computer-executable instructions for compressing a series of operations performed on an application object, comprising:
  instructions for providing a class definition for a transaction object, the transaction object including at least one function that compresses an identified series of operations performed on an instance of an application object class used in a graphical model;
  instructions for deriving an application object from the class definition for the transaction object, where the application object is used in a graphical model;
  instructions for performing a series of operations on the derived application object; and
  instructions for compressing the series of operations using the at least one function to produce a compressed series, where the compressed series is used to log, undo, or redo a longer series of operations that can be represented as a smaller series of operations.

2. The medium of claim 1 wherein the graphical model is a block diagram and the application object is associated with a block in the block diagram.

3. The medium of claim 2 wherein the series of operations results from a movement of the block in the block diagram.

4. The medium of claim 1, further comprising:
  instructions for exposing the class definition to a user so that the class definition is adjustable by the user.

5. The medium of claim 4, wherein the series of operations is of a type, and the medium further comprises:
  instructions for altering the type for the compressed series of operations.

6. The medium of claim 4, wherein the series of operations has a starting point or an ending point and wherein the medium further comprises:
  instructions for altering a definition of at least one of the starting point or the ending point for the compressed series of operations.

7. The medium of claim 4, further comprising:
  instructions for specifying in the definition a recordal of at least one intermediate operation in the compressed series of operations.

8. The medium of claim 1, further comprising:
  instructions for displaying information about the compressed series of operations to a user.

9. The medium of claim 1, further comprising:
  instructions for performing an undo operation on the compressed series of operations.

10. A computer-implemented method for compressing a series of operations performed on an application object, comprising:
  providing a class definition for a transaction object, the transaction object including at least one function that compresses an identified series of operations performed on an application object, the application object derived from the class definition for the transaction object;
  performing a series of operations on the derived application object; and
  compressing the series of operations using the at least one function to produce a compressed series, where the compressed series is used to log, undo, or redo a longer series of operations that can be represented as a smaller series of operations.

11. The method of claim 10 wherein the graphical model is a block diagram and the application object is associated with a block in the block diagram.

12. The method of claim 11 wherein the series of operations results from a movement of the block in the block diagram.

13. The method of claim 10, further comprising:
  exposing the class definition to a user so that the class definition is adjustable by the user.

14. The method of claim 13, wherein the series of operations is of a type, and the method further comprises:
  altering the type for the compressed series of operations.

15. The method of claim 13, wherein the series of operations has a starting point or an ending point and wherein the method further comprises:
  altering a definition of at least one of the starting point or the ending point for the compressed series of operations.

16. The method of claim 13, further comprising:
specifying in the definition a recordal of at least one intermediate operation in the compressed series of operations.

17. The method of claim 10, further comprising:
displaying information about the compressed series of operations to a user.

18. The method of claim 10, further comprising:
performing an undo operation on the compressed series of operations.

19. A system, comprising:
means for providing a class definition for a transaction object, the transaction object including at least one function that compresses an identified series of operations performed on an instance of an application object class used in a graphical model;
means for deriving an application object from the class definition for the transaction object, where the application object is used in a graphical model;
means for performing a series of operations on the derived application object; and
means for compressing the series of operations using the at least one function to produce a compressed series, where the compressed series is used to log, undo, or redo a longer series of operations that can be represented as a smaller series of operations.

20. The system of claim 19, further comprising:
means for exposing the class definition to a user so that the class definition is adjustable by the user.

* * * * *